(12) United States Patent
Onodera et al.

(10) Patent No.: US 10,964,479 B2
(45) Date of Patent: Mar. 30, 2021

(54) ELECTRONIC COMPONENT

(71) Applicant: TDK CORPORATION, Tokyo (JP)

(72) Inventors: Shinya Onodera, Tokyo (JP); Takehisa Tamura, Tokyo (JP); Atsushi Takeda, Tokyo (JP); Yuichi Nagai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/724,441

(22) Filed: Dec. 23, 2019

(65) Prior Publication Data

US 2020/0211774 A1 Jul. 2, 2020

(30) Foreign Application Priority Data

Dec. 27, 2018 (JP) .............................. JP2018-244477

(51) Int. Cl.
| | |
|---|---|
| *H01G 4/232* | (2006.01) |
| *H01G 4/30* | (2006.01) |
| *H01G 4/248* | (2006.01) |
| *H01G 4/008* | (2006.01) |
| *H01G 4/12* | (2006.01) |

(52) U.S. Cl.
CPC .......... *H01G 4/2325* (2013.01); *H01G 4/248* (2013.01); *H01G 4/30* (2013.01); *H01G 4/008* (2013.01); *H01G 4/1227* (2013.01); *H01G 4/1245* (2013.01)

(58) Field of Classification Search
None
See application file for complete search history.

(56) References Cited

U.S. PATENT DOCUMENTS

| | | | | |
|---|---|---|---|---|
| 10,026,556 | B2* | 7/2018 | Ando | H01G 4/30 |
| 10,650,971 | B2* | 5/2020 | Jung | H01G 4/232 |
| 2016/0351332 | A1* | 12/2016 | Lee | H01G 4/30 |
| 2017/0098505 | A1* | 4/2017 | Ando | H01G 4/232 |
| 2019/0237259 | A1* | 8/2019 | Onodera | H01G 4/30 |
| 2020/0211775 | A1* | 7/2020 | Onodera | H01G 4/2325 |
| 2020/0251283 | A1* | 8/2020 | Onodera | H01G 4/30 |

FOREIGN PATENT DOCUMENTS

JP H05-144665 A 6/1993

* cited by examiner

*Primary Examiner* — Dion Ferguson
(74) *Attorney, Agent, or Firm* — Oliff PLC

(57) ABSTRACT

An electronic component includes an element body and an external electrode disposed on the element body. The external electrode includes a sintered metal layer, a conductive resin layer disposed on the sintered metal layer, and a solder plating layer arranged to constitute an outermost layer of the external electrode. A space exists in the conductive resin layer or between the conductive resin layer and the sintered metal layer. A first maximum length of the space in a thickness direction of the conductive resin layer is shorter than a second maximum length of the space in a direction orthogonal to the thickness direction of the conductive resin layer.

10 Claims, 9 Drawing Sheets

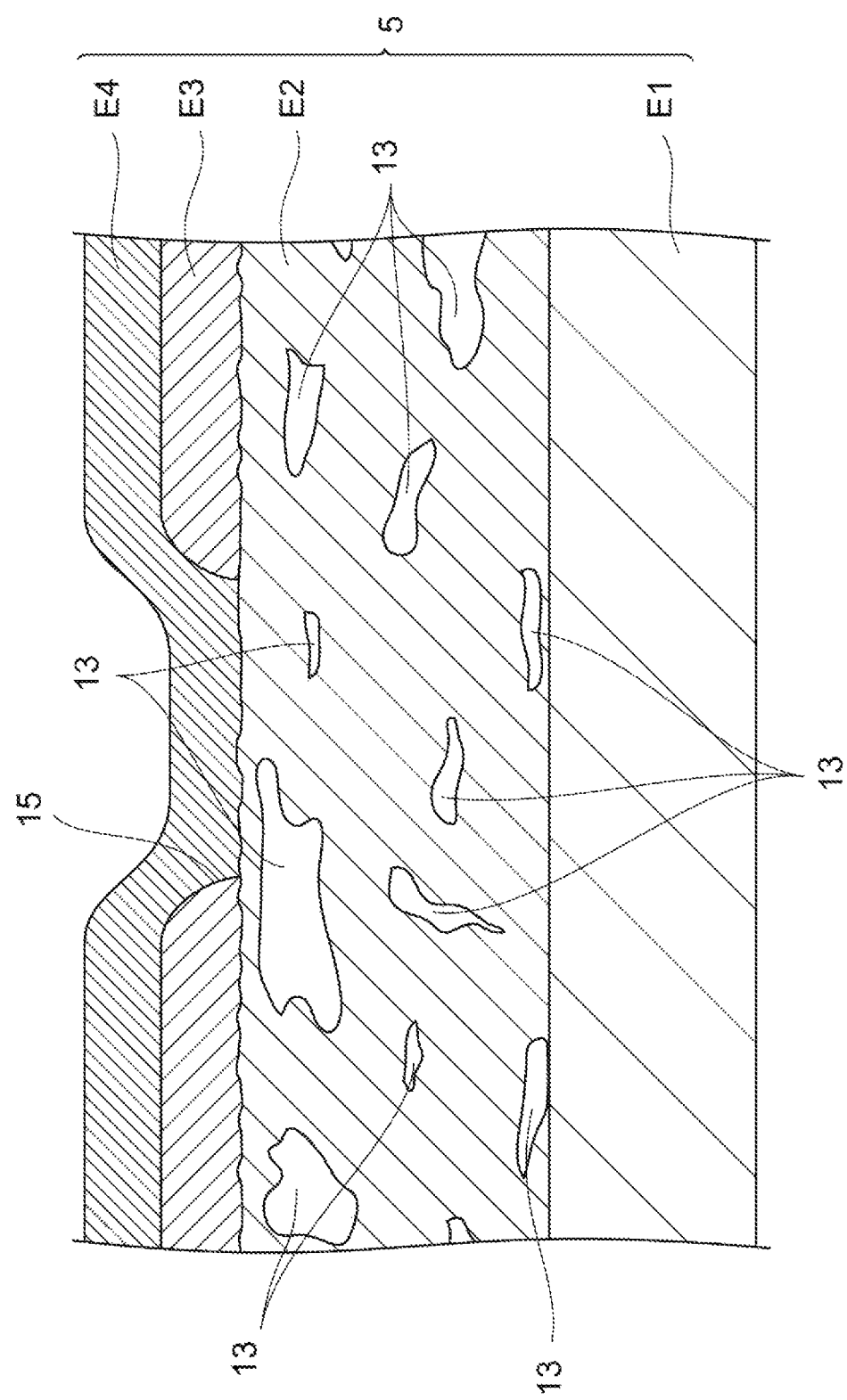

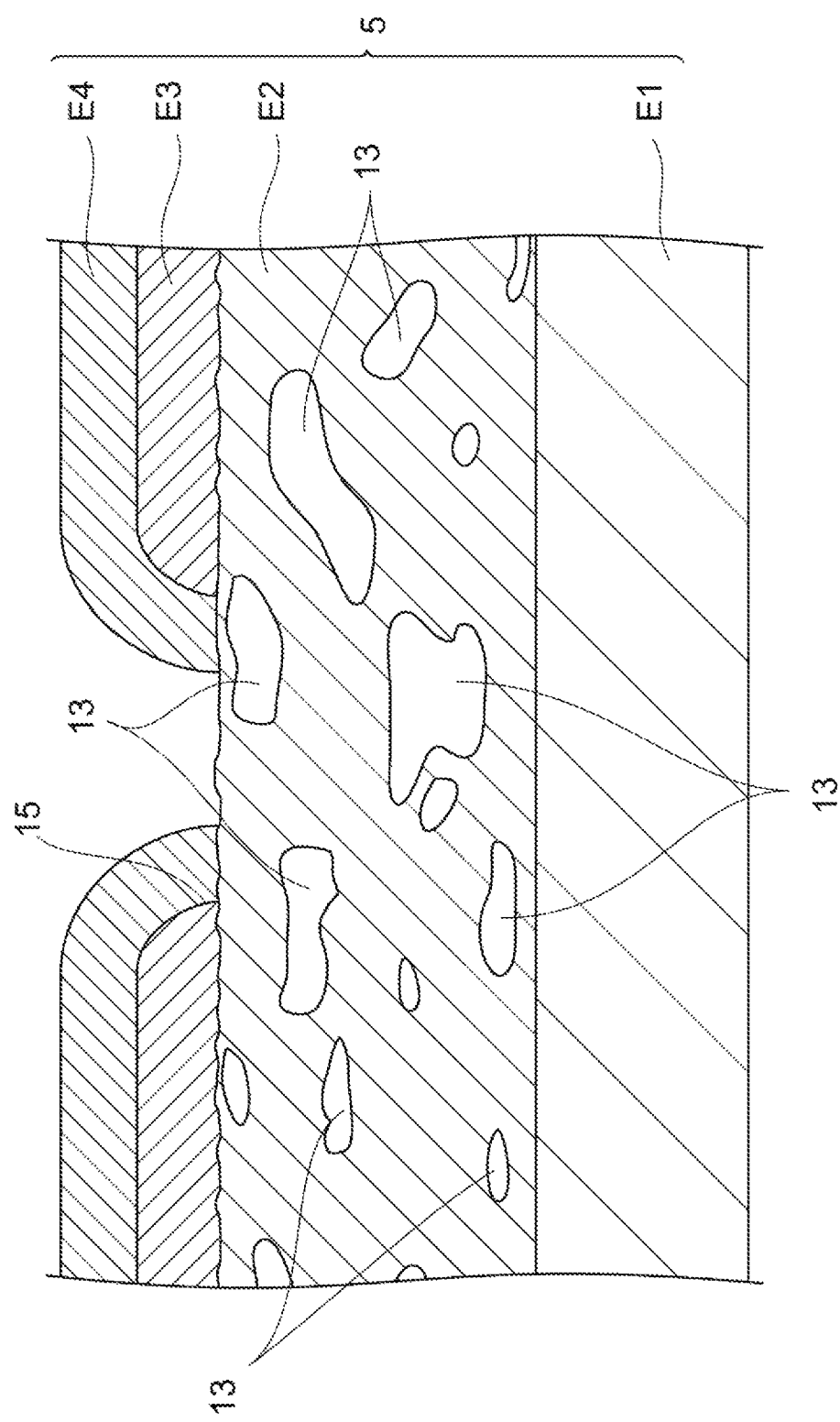

ELECTRONIC COMPONENT

BACKGROUND OF THE INVENTION

1. Field of the Invention

The present invention relates to an electronic component.

2. Description of Related Art

Known electronic components include an element body and an external electrode disposed on the element body (see, for example, Japanese Unexamined Patent Publication No. H05-144665). The external electrode includes a sintered metal layer, a conductive resin layer disposed on the sintered metal layer, and a solder plating layer arranged to constitute the outermost layer of the external electrode.

SUMMARY OF THE INVENTION

The conductive resin layer generally contains a resin and conductive metal particles. The resin tends to absorb moisture. In a case in which the electronic component is solder-mounted on an electronic device, the moisture absorbed by the resin may be gasified so that volume expansion may occur. In this case, stress acts on the conductive resin layer, and the conductive resin layer tends to be peeled off from the sintered metal layer. The electronic device includes, for example, a circuit board or an electronic component.

An object of one aspect of the present invention is to provide an electronic component that suppresses peel-off of a conductive resin layer from a sintered metal layer.

An electronic component according to one aspect of the present invention includes an element body and an external electrode disposed on the element body. The external electrode includes a sintered metal layer, a conductive resin layer disposed on the sintered metal layer, and a solder plating layer arranged to constitute an outermost layer of the external electrode. A space exists in the conductive resin layer or between the conductive resin layer and the sintered metal layer. A first maximum length of the space in a thickness direction of the conductive resin layer is shorter than a second maximum length of the space in a direction orthogonal to the thickness direction of the conductive resin layer.

In the one aspect, the external electrode includes the solder plating layer. Therefore, the one aspect can be solder-mounted on an electronic device.

The space exists in the conductive resin layer or between the conductive resin layer and the sintered metal layer. In a case in which moisture absorbed by a resin is gasified when the electronic component is solder-mounted, a gas generated from the moisture moves into the space. Therefore, stress tends not to act on the conductive resin layer. Consequently, the one aspect suppresses peel-off of a conductive resin layer from the sintered metal layer.

In the one aspect, the space having a large volume can exist in the conductive resin layer or between the conductive resin layer and the sintered metal layer, as compared with a configuration in which the first maximum length is equal to or longer than the second maximum length. Therefore, the one aspect implements a configuration in which the stress further tends not to act on the conductive resin layer.

In the one aspect, the first maximum length may be in a range of 30 to 70% of a maximum width of the conductive resin layer.

In a case in which the first maximum length is longer than 70% of the maximum width of the conductive resin layer, strength of the external electrode tends to deteriorate. In this case, an external force may act on the electronic component from the electronic device through a solder fillet formed during solder-mounting. The external force acts on the external electrode from the solder fillet. Due to the stress caused by the external force, a crack starting from the space tends to occur in the external electrode.

In contrast, a configuration in which the first maximum length is equal to or shorter than 70% of the maximum width of the conductive resin layer suppresses the deterioration in the strength of the external electrode. Therefore, in this configuration, a crack tends not to occur in the external electrode after solder-mounting.

In a case in which the first maximum length is shorter than 30% of the maximum width of the conductive resin layer, stress tends to act on the conductive resin layer due to the pressure of the gas having moved into the space.

In contrast, in a configuration in which the first maximum length is equal to or longer than 30% of the maximum width of the conductive resin layer, the pressure of the gas having moved into the space tends not to increases. Therefore, this configuration reliably suppresses the stress from acting on the conductive resin layer.

In the one aspect, the second maximum length may be in the range of 50 to 200% of the maximum width of the conductive resin layer.

In a case in which the maximum length of the space in the direction orthogonal to the thickness direction of the conductive resin layer is longer than 200% of the maximum width of the conductive resin layer, strength of the external electrode tends to deteriorate. In this case, an external force may act on the electronic component from the electronic device through a solder fillet formed during solder-mounting. The external force acts on the external electrode from the solder fillet. Due to the stress caused by the external force, a crack starting from the space tends to occur in the external electrode.

In contrast, a configuration in which the maximum length of the space in the direction orthogonal to the thickness direction of the conductive resin layer is equal to or shorter than 200% of the maximum width of the conductive resin layer suppresses the deterioration in the strength of the external electrode. Therefore, in this configuration, a crack tends not to occur in the external electrode after solder-mounting.

In a case in which the maximum length of the space in the direction orthogonal to the thickness direction of the conductive resin layer is shorter than 50% of the maximum width of the conductive resin layer, stress tends to act on the conductive resin layer due to the pressure of the gas having moved into the space.

In contrast, in a configuration in which the maximum length of the space in the direction orthogonal to the thickness direction of the conductive resin layer is equal to or longer than 50% of the maximum width of the conductive resin layer, the pressure of the gas having moved into the space tends not to increases. Therefore, this configuration reliably suppresses the stress from acting on the conductive resin layer.

In the one aspect, the element body may include a principal surface arranged to constitute a mounting surface and an end surface adjacent to the principal surface. The external electrode may be disposed at least on the end surface. The space may be located on a central portion of the end surface.

In a case in which the electronic component is solder-mounted on the electronic device, a crack starting from the space tends to occur in the external electrode due to the stress caused by the external force as described above. The stress generated in the vicinity of the space tends to increase as a distance from the electronic device to the space decreases. In a configuration in which the space is located on the central portion of the end surface, the distance from the electronic device (mounting surface) to the space is long regardless of a mounting direction of the electronic component. Therefore, the stress acting on the external electrode is small. Consequently, this configuration suppresses the occurrence of the crack in the external electrode.

In the one aspect, the area of the space may be in the range of 5 to 50% of the area of the conductive resin layer in a cross-section along the thickness direction of the conductive resin layer.

In a case in which the electronic component is solder-mounted on the electronic device, a crack starting from the space tends to occur in the external electrode due to the stress caused by the external force as described above. This configuration further suppresses the deterioration in the strength of the external electrode. Therefore, the crack further tends not to occur in the external electrode. This configuration more reliably suppresses the stress from acting on the conductive resin layer.

In the one aspect, the area of the space may be in the range of 5 to 30% of the area of the conductive resin layer in a cross-section along the thickness direction of the conductive resin layer. This configuration further enhances the effect of suppressing the deterioration in the strength of the external electrode and the effect of suppressing the stress from acting on the conductive resin layer.

In the one aspect, the external electrode may include an intermediate plating layer disposed between the conductive resin layer and the solder plating layer. The intermediate plating layer may have better solder leach resistance than metal contained in the conductive resin layer. An opening that communicates with the space may be formed in the intermediate plating layer.

This configuration suppresses the occurrence of solder leaching when the electronic component is solder-mounted.

In this configuration, the opening formed in the intermediate plating layer communicates with the space, and thus, the gas having moved into the space moves out of the external electrode through the opening during solder-mounting. Consequently, this configuration further suppresses the stress from acting on the conductive resin layer.

In the one aspect, an inner diameter of the opening may be shorter than the second maximum length. In this case, molten solder tends not to reach the conductive resin layer through the opening during solder-mounting. Therefore, this configuration reliably suppresses the occurrence of solder leaching.

In the one aspect, the inner diameter of the opening may be in the range of 5 to 30% of the second maximum length. In this case, the occurrence of solder leaching is reliably suppressed. This configuration more reliably suppresses the occurrence of solder leaching and further suppresses the stress from acting on the conductive resin layer reliably.

An electronic component according to another aspect of the present invention includes an element body and an external electrode disposed on the element body. The external electrode includes a sintered metal layer; a conductive resin layer disposed on the sintered metal layer; and a solder plating layer arranged to constitute an outermost layer of the external electrode. A space exists in the conductive resin layer or between the conductive resin layer and the sintered metal layer. The space is flat in a thickness direction of the conductive resin layer.

In the other aspect, the external electrode includes the solder plating layer. Therefore, the other aspect can be solder-mounted on an electronic device.

The space exists in the conductive resin layer or between the conductive resin layer and the sintered metal layer. In a case in which moisture absorbed by a resin is gasified when the electronic component is solder-mounted, a gas generated from the moisture moves into the space. Therefore, stress tends not to act on the conductive resin layer. Consequently, the other aspect suppresses peel-off of a conductive resin layer from the sintered metal layer.

In the other aspect, the space is flat in a thickness direction of the conductive resin layer, and thus the space having a large volume can exist in the conductive resin layer or between the conductive resin layer and the sintered metal layer. Therefore, the other aspect implements a configuration in which the stress further tends not to act on the conductive resin layer.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 8 is a view illustrating a cross-sectional configuration of an external electrode; and FIG. 9 is a view illustrating a cross-sectional configuration of an external electrode.

DETAILED DESCRIPTION OF EMBODIMENTS

Figure 1:
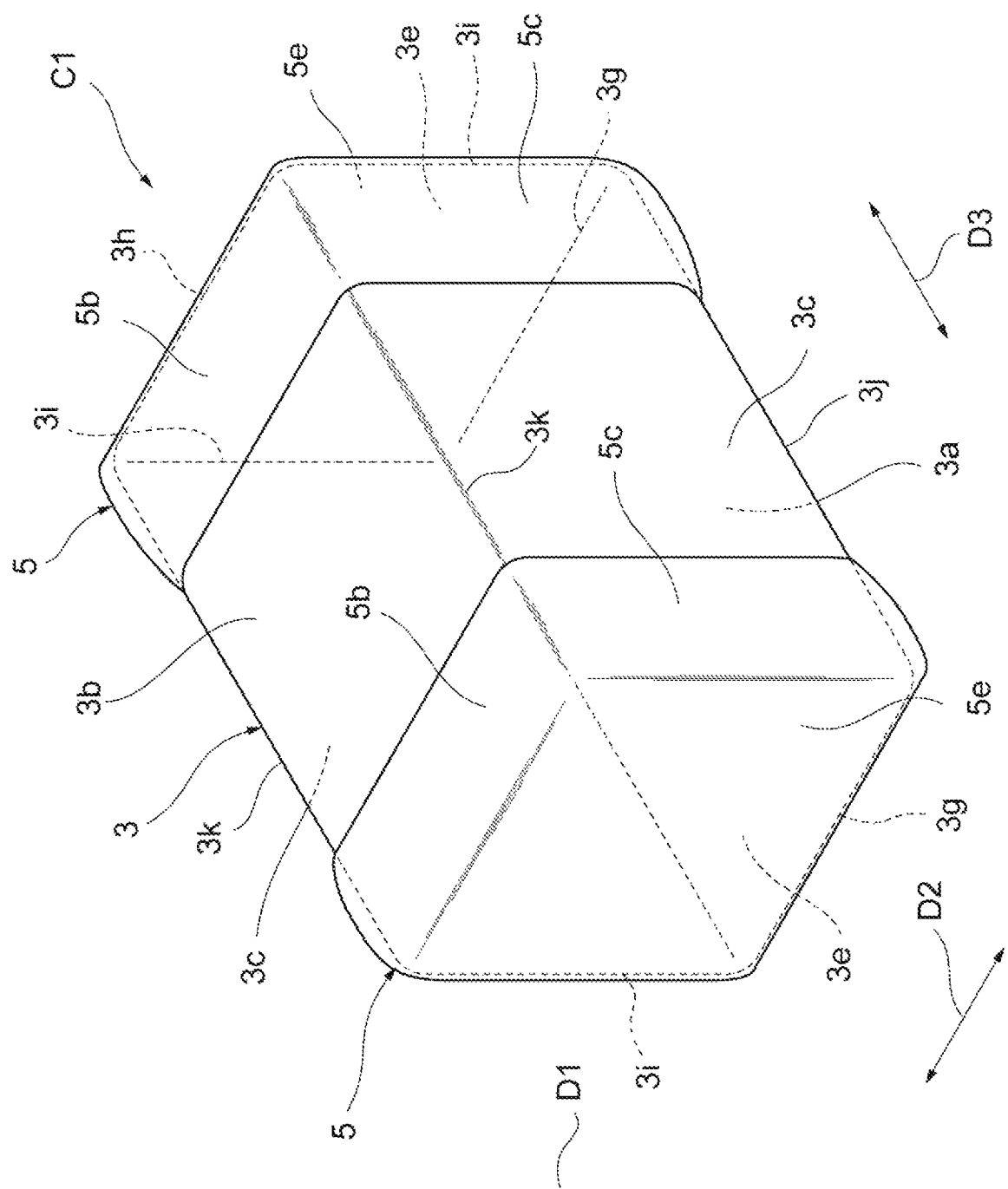
FIG. 1 is a perspective view of a multilayer capacitor according to an embodiment.

Hereinafter, embodiments of the present invention will be described in detail with reference to the accompanying drawings. In the following description, the same elements or elements having the same functions are denoted with the same reference numerals and overlapped explanation is omitted.

A configuration of a multilayer capacitor C1 according to an embodiment will be described with reference to FIGS. 1 to 5. FIG. 1 is a perspective view of the multilayer capacitor according to the embodiment. FIGS. 2 to 5 are views illustrating a cross-sectional configuration of the multilayer capacitor according to the embodiment. In the present embodiment, an electronic component is, for example, the multilayer capacitor C1.

As illustrated in FIG. 1, the multilayer capacitor C1 includes an element body 3 of a rectangular parallelepiped shape and a plurality of external electrodes 5. In the present embodiment, the multilayer capacitor C1 includes a pair of external electrodes 5. The pair of external electrodes 5 is disposed on an outer surface of the element body 3. The pair of external electrodes 5 is separated from each other. The rectangular parallelepiped shape includes a rectangular parallelepiped shape in which corners and ridges are chamfered, and a rectangular parallelepiped shape in which the corners and ridges are rounded.

The element body 3 includes a pair of principal surfaces 3a and 3b opposing each other, a pair of side surfaces 3c opposing each other, and a pair of end surfaces 3e opposing each other. The pair of principal surfaces 3a and 3b, the pair of side surfaces 3c, and the pair of end surfaces 3e have a rectangular shape. The direction in which the pair of principal surfaces 3a and 3b opposes each other is a first direction D1. The direction in which the pair of side surfaces 3c opposes each other is a second direction D2. The direction in which the pair of end surfaces 3e opposes each other is a third direction D3. The multilayer capacitor C1 is solder-mounted on an electronic device. The electronic device includes, for example, a circuit board or an electronic component. The principal surface 3a of the multilayer capacitor C1 opposes the electronic device. The principal surface 3a is arranged to constitute a mounting surface. The principal surface 3a is the mounting surface. The principal surface 3b may be arranged to constitute the mounting surface. In a case in which, the principal surface 3b is the mounting surface.

The first direction D1 is a direction orthogonal to the respective principal surfaces 3a and 3b and is orthogonal to the second direction D2. The third direction D3 is a direction parallel to the respective principal surfaces 3a and 3b and the respective side surfaces 3c, and is orthogonal to the first direction D1 and the second direction D2. The second direction D2 is a direction orthogonal to the respective side surfaces 3c. The third direction D3 is a direction orthogonal to the respective end surfaces 3e. In the present embodiment, a length of the element body 3 in the third direction D3 is larger than a length of the element body 3 in the first direction D1, and larger than a length of the element body 3 in the second direction D2. The third direction D3 is a longitudinal direction of the element body 3. The length of the element body 3 in the first direction D1 and the length of the element body 3 in the second direction D2 may be equivalent to each other. The length of the element body 3 in the first direction D1 and the length of the element body 3 in the second direction D2 may be different from each other.

The pair of side surfaces 3c extends in the first direction D1 to couple the pair of principal surfaces 3a and 3b. The pair of side surfaces 3c also extends in the third direction D1. The pair of end surfaces 3e extends in the first direction D1 to couple the pair of principal surfaces 3a and 3b. The pair of end surfaces 3e extends in the second direction D2.

The element body 3 includes a pair of ridge portions 3g, a pair of ridge portions 3h, four ridge portions 3i, a pair of ridge portions 3j, and a pair of ridge portions 3k. The ridge portion 3g is located between the end surface 3e and the principal surface 3a. The ridge portion 3h is positioned between the end surface 3e and the principal surface 3b. The ridge portion 3i is positioned between the end surface 3e and the side surface 3c. The ridge portion 3j is positioned between the principal surface 3a and the side surface 3c. The ridge portion 3k is positioned between the principal surface 3b and the side surface 3c. In the present embodiment, each of the ridge portions 3g, 3h, 3i, 3j, and 3k is rounded to curve. The element body 3 is subject to what is called a round chamfering process.

The end surface 3e and the principal surface 3a are indirectly adjacent to each other with the ridge portion 3g between the end surface 3e and the principal surface 3a. The end surface 3e and the principal surface 3b are indirectly adjacent to each other with the ridge portion 3h between the end surface 3e and the principal surface 3b. The end surface 3e and the side surface 3c are indirectly adjacent to each other with the ridge portion 3i between the end surface 3e and the side surface 3c. The principal surface 3a and the side surface 3c are indirectly adjacent to each other with the ridge portion 3j between the principal surface 3a and the side surface 3c. The principal surface 3b and the side surface 3c are indirectly adjacent to each other with the ridge portion 3k between the principal surface 3b and the side surface 3c.

The element body 3 is configured by laminating a plurality of dielectric layers in the first direction D1. The element body 3 includes the plurality of laminated dielectric layers. In the element body 3, a lamination direction of the plurality of dielectric layers coincides with the first direction D1. Each dielectric layer includes, for example, a sintered body of a ceramic green sheet containing a dielectric material. The dielectric material includes, for example, a dielectric ceramic of $BaTiO_3$ base, $Ba(Ti,Zr)O_3$ base, or $(Ba,Ca)TiO_3$ base. In an actual element body 3, each of the dielectric layers is integrated to such an extent that a boundary between the dielectric layers cannot be visually recognized. In the element body 3, the lamination direction of the plurality of dielectric layers may coincide with the second direction D2.

As illustrated in FIGS. 2 to 5, the multilayer capacitor C1 includes a plurality of internal electrodes 7 and a plurality of internal electrodes 9. Each of the internal electrodes 7 and 9 is an internal conductor disposed in the element body 3. Each of the internal electrodes 7 and 9 is made of a conductive material that is commonly used as an internal conductor of a multilayer electronic component. The conductive material includes, for example, a base metal. The conductive material includes, for example, Ni or Cu. Each of the internal electrodes 7 and 9 is configured as a sintered body of conductive paste containing the conductive material described above. In the present embodiment, the internal electrodes 7 and 9 are made of Ni.

The internal electrodes 7 and the internal electrodes 9 are disposed in different positions (layers) in the first direction D1. The internal electrodes 7 and the internal electrodes 9 are alternately disposed in the element body 3 to oppose each other in the first direction D1 with an interval therebetween. Polarities of the internal electrodes 7 and the internal electrodes 9 are different from each other. In a case in which the lamination direction of the plurality of dielectric layers is the second direction D2, the internal electrodes 7 and the internal electrodes 9 are disposed in different positions (layers) in the second direction D2. One end of each of the internal electrodes 7 and 9 is exposed to a corresponding end surface 3e of the pair of the end surfaces 3e. Each of the internal electrodes 7 and 9 includes the one end exposed to the corresponding end surface 3e.

The plurality of internal electrodes 7 and the plurality of internal electrodes 9 are alternately disposed in the first direction D1. The internal electrodes 7 and 9 are positioned in a plane approximately parallel to the principal surfaces 3a and 3b. The internal electrodes 7 and the internal electrodes 9 oppose each other in the first direction D1. The direction (first direction D1) in which the internal electrodes 7 and the internal electrodes 9 oppose each other is orthogonal to the direction (second direction D2 and third direction D3) parallel to the principal surfaces 3a and 3b. In a case in which the lamination direction of the plurality of dielectric layers is the second direction D2, the plurality of internal electrodes 7 and the plurality of internal electrodes 9 are alternately disposed in the second direction D2. In this case, the internal electrodes 7 and 9 are positioned in a plane approximately orthogonal to the principal surfaces 3a and 3b. The internal electrodes 7 and the internal electrodes 9 oppose each other in the second direction D2.

As illustrated in FIG. 1, the external electrodes 5 are disposed at both end portions of the element body 3 in the third direction D3. Each of the external electrodes 5 is disposed on the corresponding end surface 3e side of the element body 3. As illustrated in FIGS. 2 to 5, the external electrode 5 includes a plurality of electrode portions 5a, 5b, 5c, and 5e. The electrode portion 5a is disposed on the principal surface 3a and the ridge portion 3g. The electrode portion 5b is disposed on the principal surface 3b and the ridge portion 3h. The electrode portion 5c is disposed on each side surface 3c and each ridge portion 3i. The electrode portion 5e is disposed on the corresponding end surface 3e. The external electrode 5 also includes electrode portions disposed on the ridge portions 3j. Each of the external electrodes 5 is disposed on at least the end surface 3e.

The external electrode 5 is formed on the five surfaces, that is, the pair of principal surfaces 3a and 3b, the end surface 3e, and the pair of side surfaces 3c, as well as on the ridge portions 3g, 3h, 3i, and 3j. The electrode portions 5a, 5b, 5c, and 5e adjacent each other are coupled and are electrically connected to each other. Each electrode portion 5e covers all the one ends of the corresponding internal electrodes 7 or 9. The electrode portion 5e is directly connected to the corresponding internal electrodes 7 or 9. The external electrode 5 is electrically connected to the corresponding internal electrodes 7 or 9. As illustrated in FIGS. 2 to 5, the external electrode 5 includes a first electrode layer E1, a second electrode layer E2, a third electrode layer E3, and a fourth electrode layer E4. The fourth electrode layer E4 is arranged to constitute the outermost layer of the external electrode 5. Each of the electrode portions 5a, 5b, 5c, and 5e includes the first electrode layer E1, the second electrode layer E2, the third electrode layer E3, and the fourth electrode layer E4.

The first electrode layer E1 included in the electrode portion 5a is disposed on the ridge portion 3g, and is not disposed on the principal surface 3a. The first electrode layer E1 included in the electrode portion 5a is formed to cover the entire ridge portion 3g. The first electrode layer E1 is not formed on the principal surface 3a. The first electrode layer E1 included in the electrode portion 5a is in contact with the entire ridge portion 3g. The principal surface 3a is not covered with the first electrode layer E1, and is exposed from the first electrode layer E1. The first electrode layer E1 included in the electrode portion 5a may be disposed on the principal surface 3a. In this case, the first electrode layer E1 included in the electrode portion 5a is formed to cover one part of the principal surface 3a and the entire ridge portion 3g. That is, the first electrode layer E1 included in the electrode portion 5a is also in contact with the one part of the principal surface 3a. The one part of the principal surface 3a is, for example, the partial region near the end surface 3e, in the principal surface 3a.

The second electrode layer E2 included in the electrode portion 5a is disposed on the first electrode layer E1 and on the principal surface 3a. In the electrode portion 5a, the second electrode layer E2 covers the entire first electrode layer E1. In the electrode portion 5a, the second electrode layer E2 is in contact with the entire first electrode layer E1. The second electrode layer E2 included in the electrode portion 5a is in contact with one part of the principal surface 3a. The one part of the principal surface 3a is, for example, the partial region near the end surface 3e, in the principal surface 3a. That is, the one part of the principal surface 3a is close to the end surface 3e. The electrode portion 5a is four-layered on the ridge portion 3g, and is three-layered on the principal surface 3a. The second electrode layer E2 included in the electrode portion 5a is formed to cover the one part of the principal surface 3a and the entire ridge portion 3g. As described above, the one part of the principal surface 3a is, for example, the partial region near the end surface 3e, in the principal surface 3a. The second electrode layer E2 included in the electrode portion 5a indirectly covers the entire ridge portion 3g in such a manner that the first electrode layer E1 is positioned between the second electrode layer E2 and the element body 3. The second electrode layer E2 included in the electrode portion 5a directly covers the one part of the principal surface 3a. The second electrode layer E2 included in the electrode portion 5a directly covers an entire portion of the first electrode layer E1 formed on the ridge portion 3g. In a case in which the first electrode layer E1 included in the electrode portion 5a is disposed on the principal surface 3a, the electrode portion 5a is four-layered on the principal surface 3a and the ridge portion 3g.

The first electrode layer E1 included in the electrode portion 5b is disposed on the ridge portion 3h, and is not disposed on the principal surface 3b. The first electrode layer E1 included in the electrode portion 5b is formed to cover the entire ridge portion 3h. The first electrode layer E1 is not formed on the principal surface 3b. The first electrode layer E1 included in the electrode portion 5b is in contact with the entire ridge portion 3h. The principal surface 3b is not covered with the first electrode layer E1, and is exposed from the first electrode layer E1. The first electrode layer E1 included in the electrode portion 5b may be disposed on the principal surface 3b. In this case, the first electrode layer E1 included in the electrode portion 5b is formed to cover one part of the principal surface 3b and the entire ridge portion 3h. That is, the first electrode layer E1 included in the electrode portion 5b is also in contact with the one part of the principal surface 3b. The one part of the principal surface 3b is, for example, the partial region near the end surface 3e, in the principal surface 3b.

The second electrode layer E2 included in the electrode portion 5b is disposed on the first electrode layer E1 and on the principal surface 3b. In the electrode portion 5b, the second electrode layer E2 covers the entire first electrode layer E1. In the electrode portion 5b, the second electrode layer E2 is in contact with the entire first electrode layer E1. The second electrode layer E2 included in the electrode portion 5b is in contact with one part of the principal surface 3b. The one part of the principal surface 3b is, for example, the partial region near the end surface 3e, in the principal surface 3b. That is, the one part of the principal surface 3b is close to the end surface 3e. The electrode portion 5b is four-layered on the ridge portion 3h, and is three-layered on the principal surface 3b. The second electrode layer E2 included in the electrode portion 5b is formed to cover the one part of the principal surface 3b and the entire ridge portion 3h. As described above, the one part of the principal surface 3b is, for example, the partial region near the end surface 3e, in the principal surface 3b. The second electrode layer E2 included in the electrode portion 5b indirectly covers the entire ridge portion 3h in such a manner that the first electrode layer E1 is positioned between the second electrode layer E2 and the element body 3. The second electrode layer E2 included in the electrode portion 5b directly covers the one part of the principal surface 3b. The second electrode layer E2 included in the electrode portion 5b directly covers an entire portion of the first electrode layer E1 formed on the ridge portion 3h. In a case in which the first electrode layer E1 included in the electrode portion 5b is disposed on the principal surface 3b, the electrode portion 5b is four-layered on the principal surface 3b and the ridge portion 3h.

The first electrode layer E1 included in the electrode portion 5c is disposed on the ridge portion 3i, and is not disposed on the side surface 3c. The first electrode layer E1 included in the electrode portion 5c is formed to cover the entire ridge portion 3i. The first electrode layer E1 is not formed on the side surface 3c. The first electrode layer E1 included in the electrode portion 5c is in contact with the entire ridge portion 3i. The side surface 3c is not covered with the first electrode layer E1, and is exposed from the first electrode layer E1. The first electrode layer E1 included in the electrode portion 5c may be disposed on the side surface 3c. In this case, the first electrode layer E1 included in the electrode portion 5c is formed to cover one part of the side surface 3c and the entire ridge portion 3i. That is, the first electrode layer E1 included in the electrode portion 5c is also in contact with the one part of the side surface 3e. The one part of the side surface 3c is, for example, the partial region near the end surface 3e, in the side surface 3c.

The second electrode layer E2 included in the electrode portion 5c is disposed on the first electrode layer E1 and on the side surface 3c. In the electrode portion 5c, the second electrode layer E2 covers the entire first electrode layer E1. In the electrode portion 5c, the second electrode layer E2 is in contact with the entire first electrode layer E1. The second electrode layer E2 included in the electrode portion 5c is in contact with one part of the side surface 3c. The one part of the side surface 3c is, for example, the partial region near the end surface 3e, in the side surface 3c. That is, the one part of the side surface 3c is close to the end surface 3e. The electrode portion 5c is four-layered on the ridge portion 3i, and is three-layered on the side surface 3c. The second electrode layer E2 included in the electrode portion 5c is formed to cover the one part of the side surface 3c and the entire ridge portion 3i. As described above, the one part of the side surface 3c is, for example, the partial region near the end surface 3e, in the side surface 3c. The second electrode layer E2 included in the electrode portion 5c indirectly covers the entire ridge portion 3i in such a manner that the first electrode layer E1 is positioned between the second electrode layer E2 and the element body 3. The second electrode layer E2 included in the electrode portion 5c directly covers the one part of the side surface 3c. The second electrode layer E2 included in the electrode portion 5c directly covers an entire portion of the first electrode layer E1 formed on the ridge portion 3i. In a case in which the first electrode layer E1 included in the electrode portion 5c is disposed on the side surface 3c, the electrode portion 5c is four-layered on the side surface 3c and the ridge portion 3i.

The second electrode layer E2 included in the electrode portion 5c may be formed to cover one part of the ridge portion 3i and one part of the side surface 3c. The one part of the ridge portion 3i is, for example, the partial region near the principal surface 3a, in the ridge portion 3i. That is, the one part of the ridge portion 3i is close to the principal surface 3a. The one part of the side surface 3c is, for example, the corner region near the principal surface 3a and end surface 3e, in the side surface 3c. That is, the one part of the side surface 3c is close to the principal surface 3a and end surface 3e. In this case, the second electrode layer E2 included in the electrode portion 5c indirectly covers the one part of the ridge portion 3i in such a manner that the first electrode layer E1 is positioned between the second electrode layer E2 and the ridge portion 3i. The second electrode layer E2 included in the electrode portion 5c directly covers the one part of the side surface 3c. The second electrode layer E2 included in the electrode portion 5c directly covers a part of the portion of the first electrode layer E1 formed on the ridge portion 3i. The electrode portion 5c includes a region where the first electrode layer E1 is exposed from the second electrode layer E2, and a region where the first electrode layer E1 is covered with the second electrode layer E2. In a case in which the second electrode layer E2 included in the electrode portion 5c is formed to cover the one part of the ridge portion 3i and the one part of the side surface 3c, as described above, the internal electrodes 7 and the internal electrodes 9 may be disposed in different positions (layers) in the second direction D2.

The first electrode layer E1 included in the electrode portion 5e is disposed on the end surface 3e. The end surface 3e is entirely covered with the first electrode layer E1. The first electrode layer E1 included in the electrode portion 5e is in contact with the entire end surface 3e. The second electrode layer E2 included in the electrode portion 5e is disposed on the first electrode layer E1. In the electrode portion 5e, the second electrode layer E2 is in contact with the entire first electrode layer E1. The second electrode layer E2 included in the electrode portion 5e is formed to cover the entire end surface 3e. The second electrode layer E2 included in the electrode portion 5e indirectly covers the entire end surface 3e in such a manner that the first electrode layer E1 is positioned between the second electrode layer E2 and the end surface 3e. The second electrode layer E2 included in the electrode portion 5e directly covers the entire first electrode layer E1. In the electrode portion 5e, the first electrode layer E1 is formed on the end surface 3e to be coupled to the one ends of the corresponding internal electrodes 7 or 9.

The second electrode layer E2 included in the electrode portion 5e may be formed to cover one part of the end surface 3e. The one part of the end surface 3e is, for example, the partial region near the principal surface 3a, in the end surface 3e. That is, the one part of the end surface 3e is close to the principal surface 3a. In this case, the second electrode layer E2 included in the electrode portion 5e indirectly covers the one part of the end surface 3e in such a manner that the first electrode layer E1 is positioned between the second electrode layer E2 and the end surface 3e. The second electrode layer E2 included in the electrode portion 5e directly covers one part of the first electrode layer E1 formed on the end surface 3e. The electrode portion 5e includes a region where the first electrode layer E1 is exposed from the second electrode layer E2, and a region where the first electrode layer E1 is covered with the second electrode layer E2. In a case in which the second electrode layer E2 included in the electrode portion 5e is formed to cover the one part of the end surface 3e, as described above, the internal electrodes 7 and the internal electrodes 9 may be disposed in different positions (layers) in the second direction D2.

The first electrode layer E1 is formed by sintering conductive paste applied onto the surface of the element body 3. The first electrode layer E1 is formed to cover the end surface 3e and the ridge portions 3g, 3h, 3i and 3j. The first electrode layer E1 is formed by sintering a metal component (metal powder) contained in the conductive paste. The first electrode layer E1 includes a sintered metal layer. The first electrode layer E1 includes a sintered metal layer formed on the element body 3. In the present embodiment, the first electrode layer E1 is a sintered metal layer made of Cu. The first electrode layer E1 may be a sintered metal layer made of Ni. The first electrode layer E1 contains a base metal. The conductive paste contains, for example, powder made of Cu or Ni, a glass component, an organic binder, and an organic solvent. The first electrode layer E1 included in the electrode portion 5a, the first electrode layer E1 included in the electrode portion 5b, the first electrode layer E1 included in the electrode portion 5c, and the first electrode layer E1 included in the electrode portion 5e are integrally formed.

The second electrode layer E2 is formed by curing conductive resin paste applied onto the first electrode layer E1. The second electrode layer E2 is formed over the first electrode layer E1 and the element body 3. The first electrode layer E1 serves as an underlying metal layer for forming the second electrode layer E2. The second electrode layer E2 is a conductive resin layer that covers the first electrode layer E1. The conductive resin paste contains, for example, a resin, a conductive material, and an organic solvent. The resin is, for example, a thermosetting resin. The conductive material includes, for example, metal powder. The metal powder includes, for example, Ag powder or Cu powder. The thermosetting resin includes, for example, a phenolic resin, an acrylic resin, a silicone resin, an epoxy resin, or a polyimide resin. The second electrode layer E2 is in contact with a partial region of the ridge portion 3j. The second electrode layer E2 included in the electrode portion 5a, the second electrode layer E2 included in the electrode portion 5b, the second electrode layer E2 included in the electrode portion 5c, and the second electrode layer E2 included in the electrode portion 5e are integrally formed.

The third electrode layer E3 is faulted on the second electrode layer E2 by plating method. In the present embodiment, the third electrode layer E3 is formed on the second electrode layer E2 by Ni plating. The third electrode layer E3 is a Ni plating layer. The third electrode layer E3 may be an Sn plating layer, a Cu plating layer, or an Au plating layer. The third electrode layer E3 contains Ni, Sn, Cu, or Au. The Ni plating layer has better solder leach resistance than the metal contained in the second electrode layer E2.

The fourth electrode layer E4 is formed on the third electrode layer E3 by plating method. The fourth electrode layer E4 includes a solder plating layer. In the present embodiment, the fourth electrode layer E4 is formed on the third electrode layer E3 by Sn plating. The fourth electrode layer E4 is an Sn plating layer. The fourth electrode layer E4 may be an Sn—Ag alloy plating layer, an Sn—Bi alloy plating layer, or an Sn—Cu alloy plating layer. The fourth electrode layer E4 contains Sn, Sn—Ag alloy, Sn—Bi alloy, or Sn—Cu alloy.

The third electrode layer E3 and the fourth electrode layer E4 constitute a plating layer formed on the second electrode layer E2. In the present embodiment, the plating layer formed on the second electrode layer E2 is two-layered. The third electrode layer E3 is an intermediate plating layer positioned between the fourth electrode layer E4 arranged to constitute the outermost layer and the second electrode layer E2. The third electrode layer E3 included in the electrode portion 5a, the third electrode layer E3 included in the electrode portion 5b, the third electrode layer E3 included in the electrode portion 5c, and the third electrode layer E3 included in the electrode portion 5e are integrally formed. The fourth electrode layer E4 included in the electrode portion 5a, the fourth electrode layer E4 included in the electrode portion 5b, the fourth electrode layer E4 included in the electrode portion 5c, and the fourth electrode layer E4 included in the electrode portion 5e are integrally formed.

Figure 2:
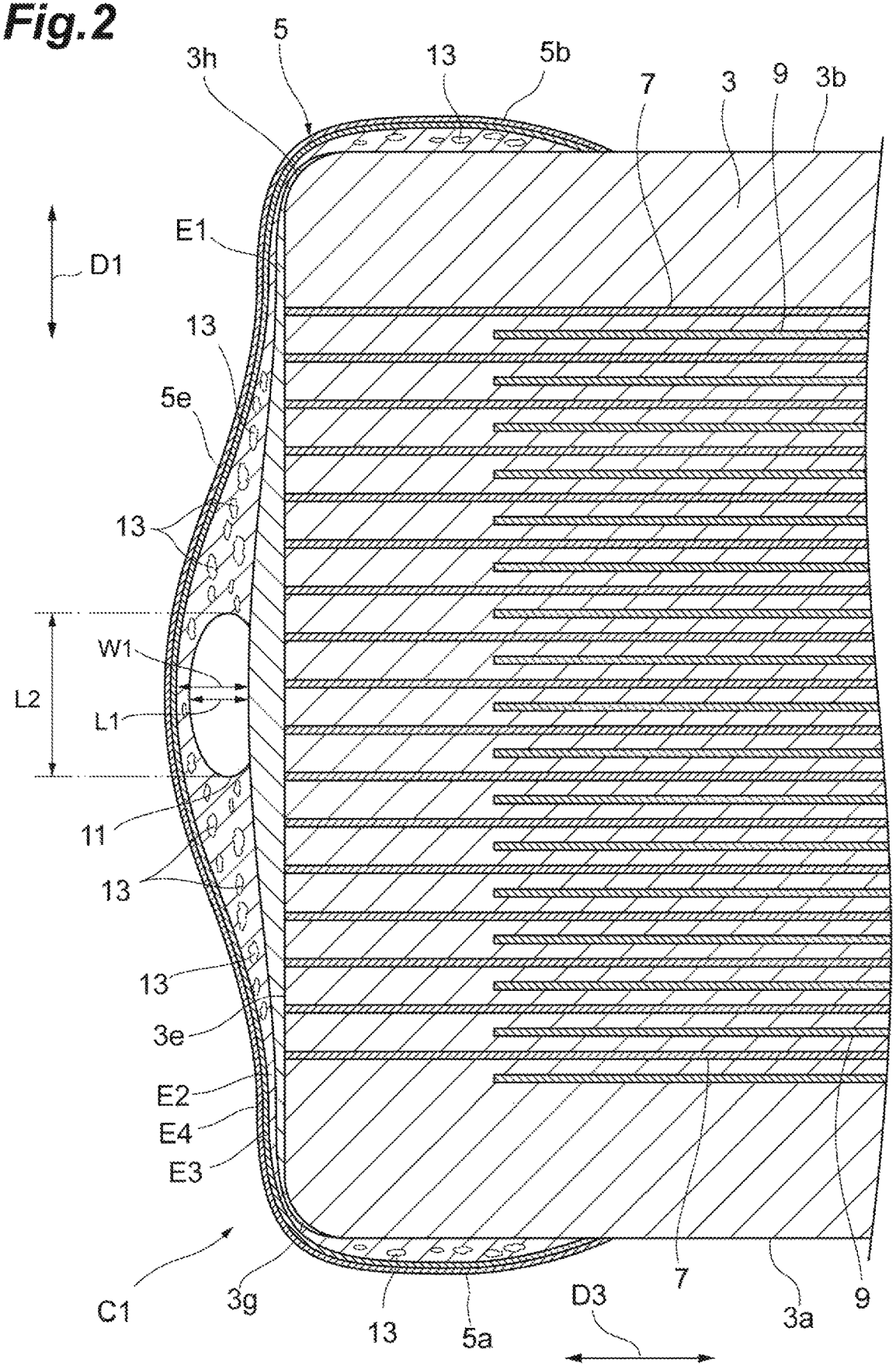
FIG. 2 is a view illustrating a cross-sectional configuration of the multilayer capacitor according to the embodiment.
Figure 3:
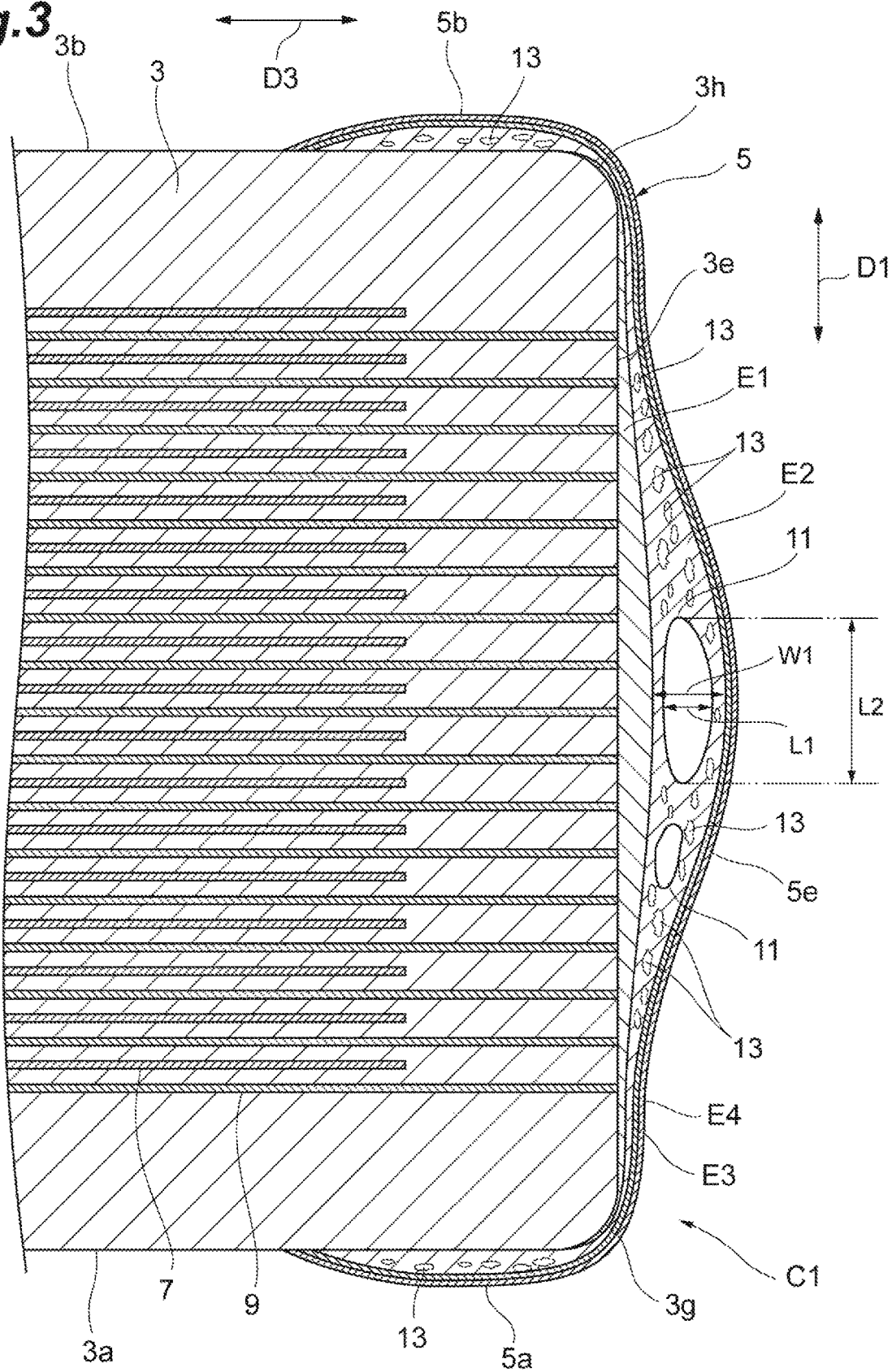
FIG. 3 is a view illustrating a cross-sectional configuration of the multilayer capacitor according to the embodiment.
Figure 4:
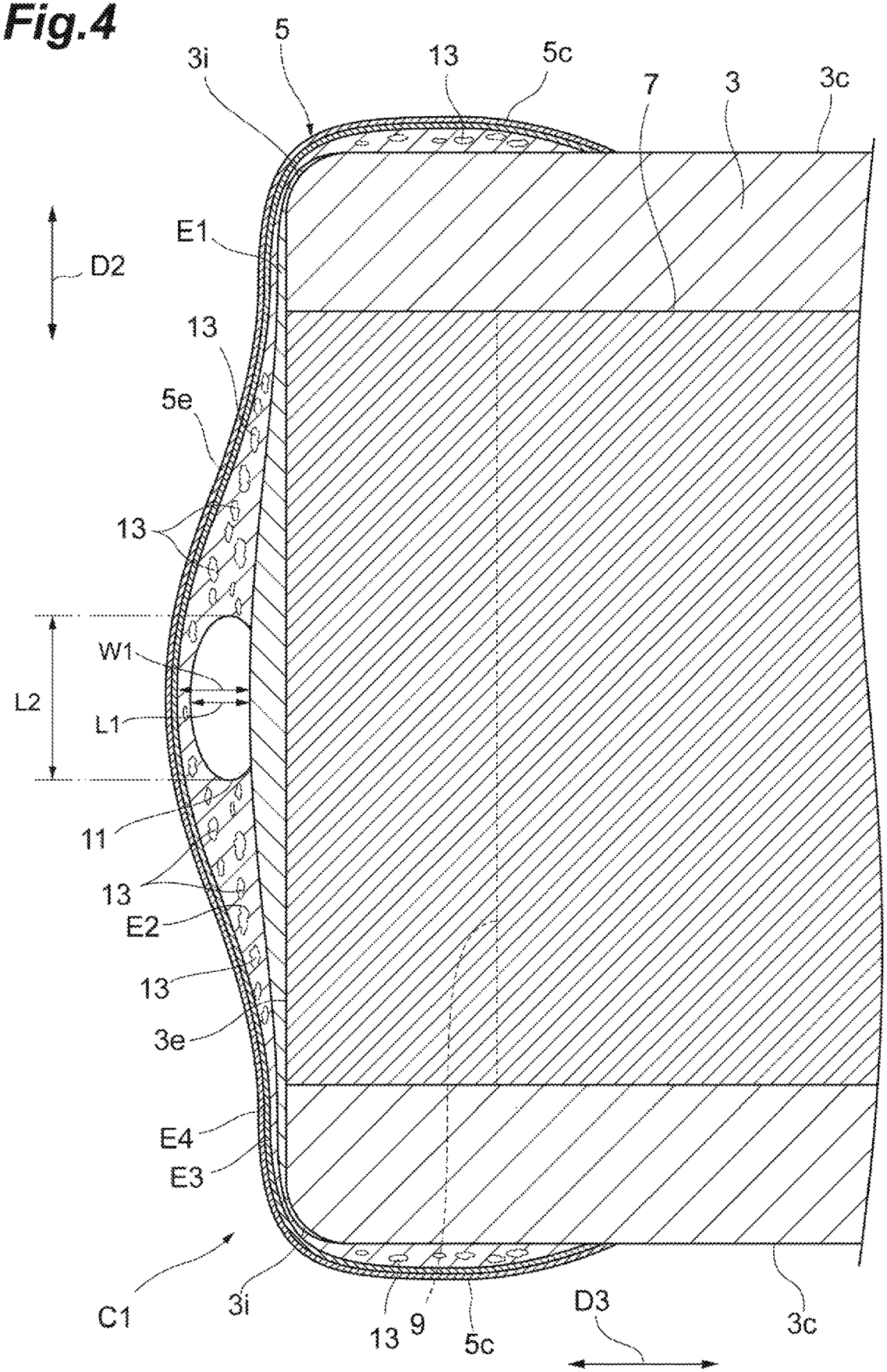
FIG. 4 is a view illustrating a cross-sectional configuration of the multilayer capacitor according to the embodiment.
Figure 5:
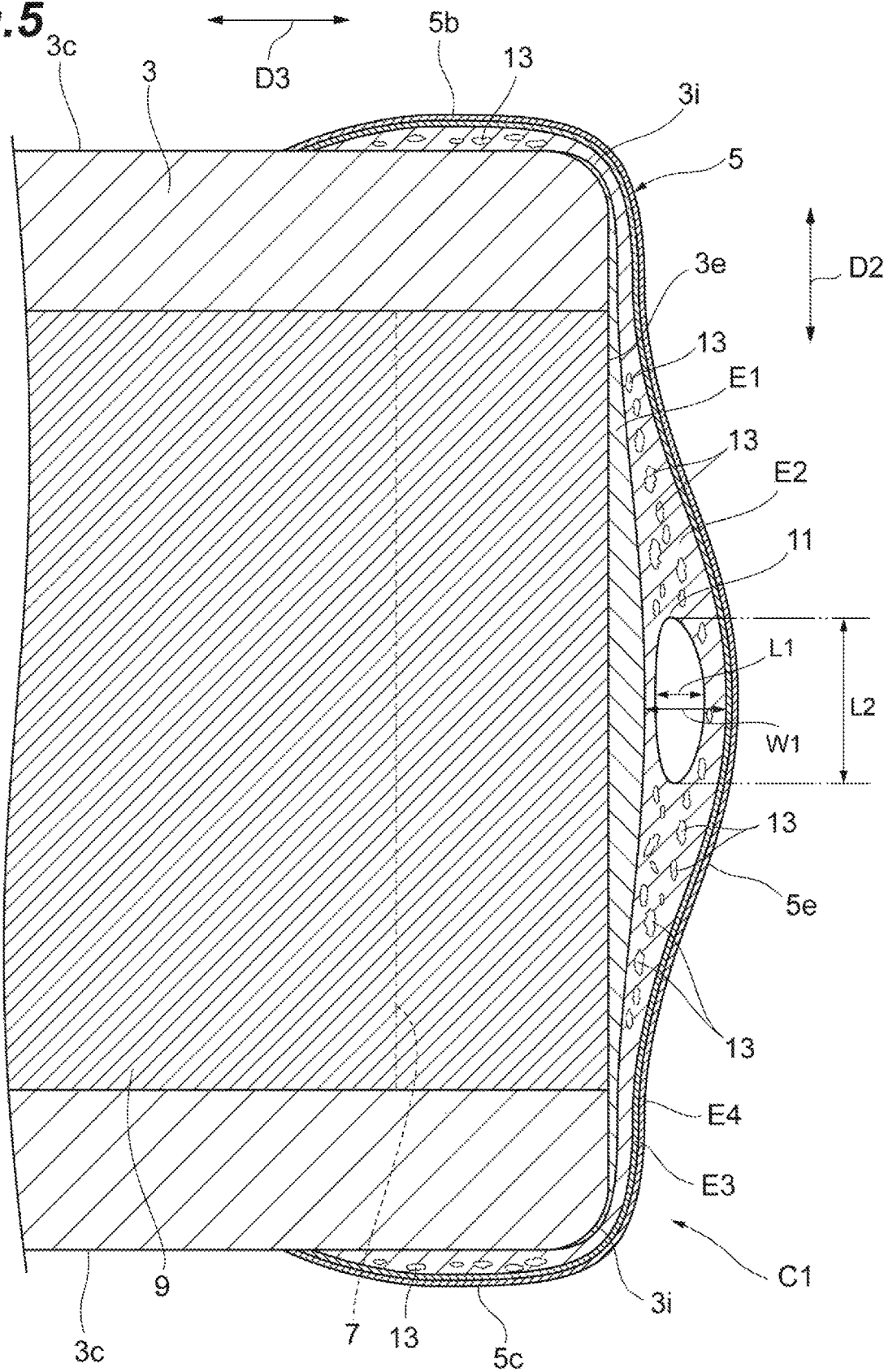
FIG. 5 is a view illustrating a cross-sectional configuration of the multilayer capacitor according to the embodiment.
Figure 6:
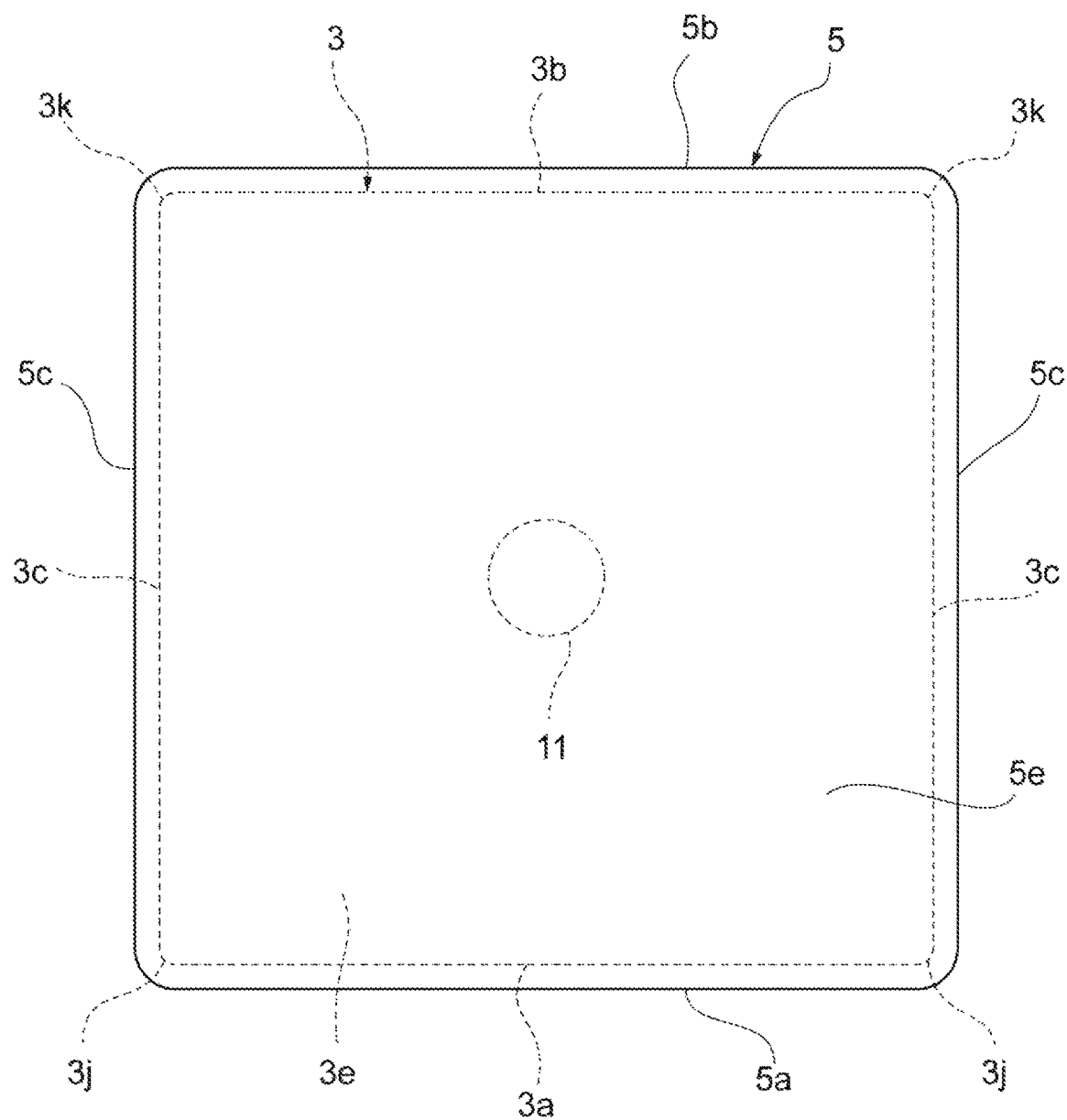
FIG. 6 is an end view illustrating a second electrode layer.
Figure 7:
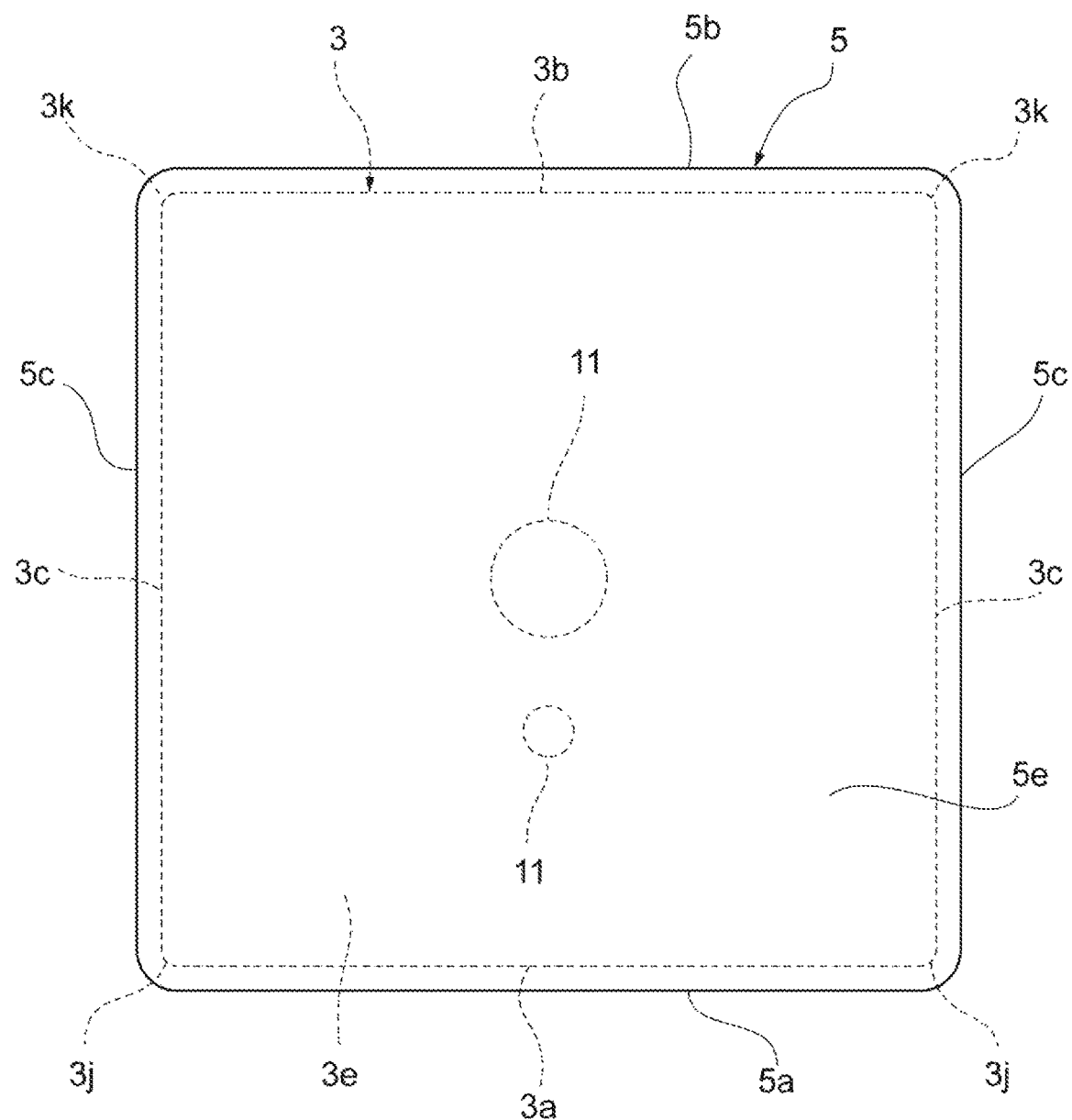
FIG. 7 is an end view illustrating a second electrode layer.

As illustrated in FIGS. 2 to 7, at least one space 11 exists in each of the external electrodes 5. As illustrated in FIGS. 2, 4, and 6, one space 11 exists in one external electrode 5. As illustrated in FIGS. 3, 5, and 7, a plurality of spaces 11 exists in another external electrode 5. Two spaces 11 exist in the other external electrode 5, for example. The space 11 exists in the second electrode layer E2 or between the second electrode layer E2 and the first electrode layer E1. In the present embodiment, each of the spaces 11 exists in the electrode portion 5e. Therefore, each of the spaces 11 exists in the second electrode layer E2 included in the electrode portion 5e or between the second electrode layer E2 and the first electrode layer E1 included in the electrode portion 5e. FIGS. 6 and 7 are end views illustrating the second electrode layer.

As illustrated in FIGS. 6 and 7, at least one space 11 is located on a central portion of the end surface 3e when viewed from the third direction D3. The central portion of the end surface 3e includes not only a center of the end surface 3e but also a position away from the center of the end surface 3e due to a measurement error. The central portion of the end surface 3e also includes a position away from the center of the end surface 3e by a predetermined length. The predetermined length is a length, for example, 50% of a length of the end surface 3e in the first direction D1 or the second direction D2.

A maximum length L1 of the space 11 in a thickness direction of the second electrode layer E2 is shorter than a maximum length L2 of the space 11 in a direction orthogonal to the thickness direction of the second electrode layer E2. The space 11 is flat in the thickness direction of the second electrode layer E2. In the present embodiment, the thickness direction of the second electrode layer E2 coincides with the direction orthogonal to the end surface 3e, and the direction orthogonal to the thickness direction of the second electrode layer E2 coincides with a direction parallel to the end surface 3e. That is, the thickness direction of the second electrode layer E2 coincides with the third direction D3, and the direction orthogonal to the thickness direction of the second electrode layer E2 coincides with a direction orthogonal to the third direction D3. The direction orthogonal to the thickness direction of the second electrode layer E2 does not necessarily coincide with the first direction D1 or the second direction D2.

The maximum length L1 of the space 11 is in the range of 30 to 70% of a maximum width W1 of the second electrode layer E2. In the present embodiment, the maximum length L1 of the space 11 is 0.010 to 0.150 mm. The maximum width W1 of the second electrode layer E2 is 0.030 to 0.200 mm. For example, the maximum length L1 of the space 11 is 0.050 mm, and the maximum width W1 of the second electrode layer E2 is 0.100 mm. In this case, the maximum length L1 of the space 11 is 50% of the maximum width W1 of the second electrode layer E2.

The maximum length L2 of the space 11 is in the range of 50 to 200% of the maximum width W1 of the second electrode layer E2. In the present embodiment, the maximum length L2 of the space 11 is 0.015 to 0.400 mm. The maximum length L2 of the space 11 is 0.150 mm, for example. In this case, the maximum length L2 of the space 11 is 150% of the maximum width W1 of the second electrode layer E2. The maximum width W1 is a length in the third direction D3 from a position of a surface of the second electrode layer E2, the position being farthest from a surface of the first electrode layer E1 in the third direction D3, to a surface of the first electrode layer E1.

In a cross-section along the thickness direction of the second electrode layer E2, the area of the space 11 is in the range of 5 to 30% of the area of the second electrode layer E2. In the present embodiment, the area of the space 11 is 0.0001 to 0.06 $mm^2$. The area of the second electrode layer E2 is 0.0003 to 1.2 $mm^2$. For example, the area of the space 11 is 0.008 $mm^2$, and the area of the second electrode layer E2 is 0.040 $mm^2$. In this case, the area of the space 11 is 20% of the area of the second electrode layer E2. In the cross-section along the thickness direction of the second electrode layer E2, the area of the space 11 may be in the range of 5 to 50% of the area of the second electrode layer E2. The area of the second electrode layer E2 is the area of the second electrode layer E2 included in the electrode portion 5e. The area of the second electrode layer E2 included in the electrode portion 5e is the area of a region defined by the surface of the first electrode layer E1 and the surface of the second electrode layer E2 in the electrode portion 5e. The area of the second electrode layer E2 includes the area of the space 11.

The maximum lengths L1 and L2 and the maximum width W1 can be obtained, for example, as follows.

A cross-sectional photograph of the external electrode 5 (electrode portion 5e) at a position where the space 11 exists is acquired. The cross-sectional photograph is a photograph obtained by capturing a cross-section when the electrode portion 5e is cut along a plane orthogonal to the end surface 3e. The cross-sectional photograph is, for example, a photograph obtained by capturing a cross-section of the electrode portion 5e when cut along a plane that is parallel to a pair of surfaces opposing each other (for example, the pair of side surfaces 3c) and equidistant from the pair of surfaces. The acquired cross-sectional photograph is subjected to image processing by software to determine a boundary of space 11 and obtain the maximum length of the space 11 in the direction orthogonal to the end surface 3e and the maximum length of the space 11 in the direction parallel to the end surface 3e. The maximum length of the space 11 in the direction orthogonal to the end surface 3e is defined as the maximum length L1. The maximum length of the space 11 in the direction parallel to the end surface 3e is defined as the maximum length L2. Similarly, the surface of the first electrode layer E1 (a boundary between the first electrode layer E1 and the second electrode layer E2) and the surface of the second electrode layer E2 (a boundary between the second electrode layer E2 and the third electrode layer E3) are determined to obtain the maximum length from the surface of the first electrode layer E1 to the surface of the second electrode layer E2 in the direction orthogonal to the end surface 3e. This maximum length is defined as the maximum width W1.

Each area of the space 11 and the second electrode layer E2 can be obtained as follows, for example.

A cross-sectional photograph of the external electrode 5 (electrode portion 5e) at a position where the space 11 exists is acquired. As described above, the cross-sectional photograph is the photograph of the cross-section of the electrode portion 5e when the electrode portion 5e is cut along the plane orthogonal to the end surface 3e. The area of the space 11 and the area of the second electrode layer E2 on the acquired cross-sectional photograph are obtained.

In the second electrode layer E2, a plurality of gaps 13 communicating with the space 11 exists as illustrated in FIGS. 2 to 5, 8, and 9. The plurality of gaps 13 is dispersed in the second electrode layer E2. Some gaps 13 of the plurality of gaps 13 communicate with each other. The gaps 13 communicating with each other constitute at least one passage. The passage constituted by the gaps 13 communicating with each other is open at the surface of the second electrode layer E2. Therefore, the space 11 is indirectly open at the surface of the second electrode layer E2 through the passage constituted by the gaps 13 communicating with each other. FIGS. 8 and 9 are views illustrating a cross-sectional configuration of the external electrode.

In the cross-section along the thickness direction of the second electrode layer E2, a maximum length of the gap 13 is in the range of 1 to 20 µm. In the present embodiment, the maximum length of the gap 13 is 10 µm. In the cross-section along the thickness direction of the second electrode layer E2, the total area of the gaps 13 existing in the second electrode layer E2 included in the electrode portion 5e is in the range of 5 to 35% of the area of the second electrode layer E2 included in the electrode portion 5e. In the present embodiment, the total area of the gaps 13 is 15 to 420,000 $µm^2$. The area of the second electrode layer E2 is 0.0003 to 1.2 $mm^2$. For example, the total area of the gaps 13 is 22,800 $µm^2$, and the area of the second electrode layer E2 is 0.114 $mm^2$. In this case, the total area of the gaps 13 is 20% of the area of the second electrode layer E2.

The maximum length of the gap 13 can be obtained, for example, as follows.

A cross-sectional photograph of the external electrode 5 (electrode portion 5e) is acquired. The cross-sectional photograph is a photograph obtained by capturing a cross-section when the electrode portion 5e is cut along a plane orthogonal to the end surface 3e. The cross-sectional photograph is, for example, a photograph obtained by capturing a cross-section of the electrode portion 5e when cut along a plane that is parallel to a pair of surfaces opposing each other (for example, the pair of side surfaces 3c) and equidistant from the pair of surfaces. The acquired cross-sectional photograph is subjected to image processing by software to determine boundaries of the gaps 13 and obtain the maximum length of the gap 13. The maximum lengths of the plurality of gaps 13 may be obtained, and an average value of the maximum lengths of the plurality of gaps 13 may be obtained. In this case, the average value is set as the maximum length of the gap 13.

The total area of the gap 13 can be obtained, for example, as follows.

A cross-sectional photograph of the external electrode 5 (electrode portion 5e) is acquired. As described above, the cross-sectional photograph is the photograph of the cross-ssection of the electrode portion 5e when the electrode portion 5e is cut along the plane orthogonal to the end surface 3e. The acquired cross-sectional photograph is subjected to image processing by software to determine boundaries of the gaps 13 and obtain the total area of the gaps 13.

As illustrated in FIGS. 8 and 9, a plurality of openings 15 is formed in the third electrode layer E3. Some openings 15 of the plurality of openings 15 overlap with openings of the passage constituted by the gaps 13 communicating with each other, the openings of the passage being located at the surface of the second electrode layer E2. The opening 15 overlaps with a part or the whole of the opening of the passage constituted by the gaps 13 communicating with each other. Therefore, the space 11 communicates with the opening 15 through the passage constituted by the gaps 13 each communicating with each other. The space 11 indirectly communicates with the opening 15.

At a position of the opening 15, the second electrode layer E2 is exposed from the third electrode layer E3. As illustrated in FIG. 8, some openings 15 of the openings 15 are covered with the fourth electrode layer E4. In a case in which the opening 15 is covered with the fourth electrode layer E4, the fourth electrode layer E4 is formed on the second electrode layer E2 at the position of the opening 15. In this case, the second electrode layer E2 is in contact with the fourth electrode layer E4 at the position of the opening 15. As illustrated in FIG. 9, in a case in which the opening 15 is not covered with the fourth electrode layer E4, the second electrode layer E2 is exposed from the fourth electrode layer E4 at the position of the opening 15. In this case, the second electrode layer E2 is exposed from the plating layer disposed on the second electrode layer E2 at the position of the opening 15. The second electrode layer E2 includes a region in contact with the third electrode layer E3, a region in contact with the fourth electrode layer E4, and a region not in contact with the plating layers (the third electrode layer E3 and the fourth electrode layer E4).

An inner diameter of the opening 15 is shorter than the maximum length L2 of the space 11. The inner diameter of the opening 15 is in the range of 5 to 30% of the maximum length L2 of the space 11. In the present embodiment, the inner diameter of the opening 15 is 1 to 40 µm. For example, the inner diameter of the opening 15 is 20 µm. In this case, the inner diameter of the opening 15 is 15% of the maximum length L2 of the space 11. The number of the openings 15 per 1 mm$^2$ is 0.1 to 10.

The inner diameter of the opening 15 can be obtained, for example, as follows.

A cross-sectional photograph of the external electrode 5 (electrode portion 5e) is acquired. The cross-sectional photograph is a photograph obtained by capturing a cross-section of the electrode portion 5e when the electrode portion 5e is cut along a plane orthogonal to the end surface 3e. The cross-sectional photograph is, for example, a photograph obtained by capturing a cross-section of the electrode portion 5e when cut along a plane that is parallel to a pair of surfaces opposing each other (for example, the pair of side surfaces 3c) and equidistant from the pair of surfaces. The acquired cross-sectional photograph is subjected to image processing by software to determine a boundary of the opening 15 and obtain a length of the opening 15. This length is defined as the inner diameter of the opening 15. Lengths of the plurality of openings 15 may be obtained, and an average value of the lengths of the plurality of openings 15 may be obtained. In this case, the average value is set as the inner diameter of the opening 15.

The number of the openings 15 can be determined, for example, as follows.

A photograph of the surface of the external electrode 5 (electrode portion 5e) is acquired. The number of openings 15 existing in an arbitrary range of a 1 mm square range on the acquired photograph is obtained. In a case in which the opening 15 is covered with the fourth electrode layer E4, a depression is formed in the fourth electrode layer E4 at the position of the opening 15 as illustrated in FIG. 8. Therefore, the position of the opening 15 is specified even in a case in which the opening 15 is covered with the fourth electrode layer E4.

As described above, the external electrode 5 includes the fourth electrode layer E4 in the present embodiment. Therefore, the multilayer capacitor C1 can be solder-mounted on the electronic device. The third electrode layer E3 suppresses the occurrence of solder leaching when the multilayer capacitor C1 is solder-mounted.

The space 11 exists in the second electrode layer E2 or between the second electrode layer E2 and the first electrode layer E1. Therefore, even in the case in which the moisture absorbed in the resin contained in the second electrode layer E2 is gasified when the multilayer capacitor C1 is solder-mounted, the gas generated from the moisture moves into the space 11. The stress tends not to act on the second electrode layer E2. Consequently, the multilayer capacitor C1 suppresses peel-off of the second electrode layer E2 from the first electrode layer E1.

In the multilayer capacitor C1, the space having a large volume can exist, as compared with a configuration in which the maximum length L1 of the space 11 is equal to or longer than the maximum length L2 of the space 11. Therefore, the multilayer capacitor C1 implements the configuration in which the stress further tends not to act on the second electrode layer E2.

In the multilayer capacitor C1, the maximum length L1 of the space 11 is in the range of 30 to 70% of the maximum width W1 of the second electrode layer E2.

In a case in which the maximum length L1 of the space 11 is longer than 70% of the maximum width W1 of the second electrode layer E2, strength of the external electrode tends to deteriorate. In this case, an external force may act on the multilayer capacitor C1 from the electronic device through a solder fillet formed during solder-mounting. The external force acts on the external electrode 5 from the solder fillet formed during solder-mounting. Due to the stress caused by the external force, a crack starting from the space 11 tends to occur in the external electrode 5.

The configuration in which the maximum length L1 of the space 11 is equal to or shorter than 70% of the maximum width W1 of the second electrode layer E2 suppresses the deterioration in the strength of the external electrode 5. Therefore, in the multilayer capacitor C1, a crack tends not to occur in the external electrode 5 after solder-mounting.

In a case in which the maximum length L1 of the space 11 is shorter than 30% of the maximum width W1 of the second electrode layer E2, stress tends to act on the second electrode layer E2 due to the pressure of the gas having moved into the space 11.

In the configuration in which the maximum length L1 of the space 11 is equal to or longer than 30% of the maximum width W1 of the second electrode layer E2, the pressure of the gas having moved into the space 11 tends not to increases. Therefore, the multilayer capacitor C1 reliably suppresses the stress from acting on the second electrode layer E2.

In the multilayer capacitor C1, the maximum length of the space 11 in the direction orthogonal to the thickness direction of the second electrode layer E2 is in the range of 50 to 200% of the maximum width of the second electrode layer E2.

In a case in which the maximum length L2 of the space 11 is longer than 200% of the maximum width W1 of the second electrode layer E2, strength of the external electrode tends to deteriorate. In this case, an external force may act on the multilayer capacitor C1 from the electronic device through a solder fillet formed during solder-mounting. The external force acts on the external electrode 5 from the solder fillet formed during solder-mounting. Due to the stress caused by the external force, a crack starting from the space 11 tends to occur in the external electrode 5.

The configuration in which the maximum length L2 of the space 11 is equal to or shorter than 200% of the maximum width W1 of the second electrode layer E2 suppresses the deterioration in the strength of the external electrode 5. Therefore, a crack hardly occurs in the external electrode 5 after solder-mounting in the multilayer capacitor C1.

In a case in which the maximum length L2 of the space 11 is shorter than 50% of the maximum width W1 of the second electrode layer E2, stress tends to act on the second electrode layer E2 due to the pressure of the gas having moved into the space 11.

In the configuration in which the maximum length L2 of the space 11 is equal to or longer than 50% of the maximum width W1 of the second electrode layer E2, the pressure of the gas having moved into the space 11 tends not to increases. Therefore, the multilayer capacitor C1 reliably suppresses the stress from acting on the second electrode layer E2.

In the multilayer capacitor C1, the maximum length L1 of the space 11 is in the range of 30 to 70% of the maximum width W1 of the second electrode layer E2, and the maximum length of the space 11 in the direction orthogonal to the thickness direction of the second electrode layer E2 is in the range of 50 to 200% of the maximum width of the second electrode layer E2. Therefore, in the multilayer capacitor C1, a crack tends not to occur in the external electrode 5 after solder-mounting. The multilayer capacitor C1 more reliably suppresses the stress from acting on the second electrode layer E2.

In the multilayer capacitor C1, the space 11 is located on the central portion of the end surface 3e.

In a case in which the multilayer capacitor C1 is solder-mounted on the electronic device, a crack starting from the space 11 tends to occur in the external electrode 5 due to the stress caused by the external force as described above. The stress generated in the vicinity of the space 11 tends to increase as a distance from the electronic device to the space 11 decreases. In a configuration in which the space 11 is located on the central portion of the end surface 3e, the distance from the electronic device (mounting surface) to the space 11 is long even in a case in which the principal surface 3a is the mounting surface or the principal surface 3b is the mounting surface. Therefore, the distance from the electronic device to the space 11 is long regardless of the mounting direction of the multilayer capacitor C1 in the multilayer capacitor C1, and the stress acting on the external electrode 5 is small. Consequently, the multilayer capacitor C1 suppresses the occurrence of the crack in the external electrode 5.

In the cross-section along the thickness direction of the second electrode layer E2, the area of the space 11 is in the range of 5 to 50% of the area of the second electrode layer E2 in the multilayer capacitor C1.

In a case in which the multilayer capacitor C1 is solder-mounted on the electronic device, a crack starting from the space 11 tends to occur in the external electrode 5 due to the stress caused by the external force as described above. In a case in which the area of the space 11 is in the range of 5 to 50% of the area of the second electrode layer E2, the multilayer capacitor C1 further suppresses the deterioration in the strength of the external electrode 5. Therefore, the crack further tends not to occur in the external electrode 5. The multilayer capacitor C1 more reliably suppresses the stress from acting on the second electrode layer E2.

In the cross-section along the thickness direction of the second electrode layer E2, the area of the space 11 may be in the range of 5 to 30% of the area of the second electrode layer E2 in the multilayer capacitor C1. In this case, the multilayer capacitor C1 further enhances the effect of suppressing the deterioration in the strength of the external electrode and the effect of suppressing the stress from acting on the second electrode layer E2.

In the multilayer capacitor C1, the external electrode 5 includes the third electrode layer E3 in which the opening 15 communicating with the space 11 is formed.

The third electrode layer E3 has better solder leach resistance. Therefore, the multilayer capacitor C1 suppresses the occurrence of solder leaching when the multilayer capacitor C1 is solder-mounted.

In the multilayer capacitor C1, the opening 15 formed in the third electrode layer E3 communicates with the space 11, and thus, the gas having moved into the space 11 during solder-mounting moves out of the external electrode 5 through the opening 15. Consequently, the multilayer capacitor C1 further suppresses the stress from acting on the second electrode layer E2.

In the multilayer capacitor C1, the inner diameter of the opening 15 is shorter than the maximum length L2 of the space 11. In this case, molten solder tends not to reach the second electrode layer E2 through the opening 15 during solder-mounting. Therefore, the multilayer capacitor C1 reliably suppresses the occurrence of solder leaching.

In the multilayer capacitor C1, the inner diameter of the opening 15 is in the range of 5 to 30% of the maximum length L2 of the space 11. In this case, the multilayer capacitor C1 more reliably suppresses the occurrence of solder leaching, and further suppresses the stress from acting on the second electrode layer E2 reliably.

In the multilayer capacitor C1, the space 11 is flat in the thickness direction of the second electrode layer E2. Therefore, in the multilayer capacitor C1, the space 11 having a large volume can exist in the second electrode layer E2 or between the second electrode layer E2 and the first electrode layer E1. Consequently, the multilayer capacitor C1 implements the configuration in which the stress further tends not to act on the second electrode layer E2.

In the multilayer capacitor C1, the total area of the gaps 13 existing in the second electrode layer E2 included in the electrode portion 5e is in the range of 5 to 35% of the area of the second electrode layer E2 included in the electrode portion 5e, in the cross-section along the thickness direction of the second electrode layer E2.

In a case in which the total area of the gaps 13 existing in the second electrode layer E2 included in the electrode portion 5e is smaller than 5% of the area of the second electrode layer E2 included in the electrode portion 5e, in the cross-section along the thickness direction of the second electrode layer E2, the gas existing in the space 11 tends not to move inside the gap 13. In a case in which the total area of the gaps 13 existing in the second electrode layer E2 included in the electrode portion 5e is larger than 35% of the area of the second electrode layer E2 included in the electrode portion 5e, in the cross-section along the thickness direction of the second electrode layer E2, moisture tends to enter the second electrode layer E2 and the gas generation amount tends to increase. Therefore, the multilayer capacitor C1 suppresses an increase in the gas generation amount, and suppresses the inhibition of gas movement in the second electrode layer E2 includes in the electrode portion 5e.

In the multilayer capacitor C1, the maximum length of the gap 13 is in the range of 1 to 20 µm in the cross-section along the thickness direction of the second electrode layer E2.

In a case in which the maximum length of the gap 13 is shorter than 1 µm in the cross-section along the thickness direction of the second electrode layer E2, the gas existing in the space 11 tends not to move inside the gap 13. In a case in which the maximum length of the gap 13 is longer than 20 µm in the cross-section along the thickness direction of the second electrode layer E2, moisture tends to remain in the second electrode layer E2 and the gas generation amount tends to increase. Therefore, the multilayer capacitor C1 suppresses the increase in the gas generation amount, and suppresses the inhibition of gas movement in the second electrode layer E2.

In the multilayer capacitor C1, the inner diameter of the opening 15 is 1 to 40 µm.

In a case in which the inner diameter of the opening 15 is shorter than 1 µm, the gas having moved from the space 11 through the gap 13 tends not to move inside the opening 15. In a case in which the inner diameter of the opening 15 is longer than 40 µm, a region where the second electrode layer E2 is exposed from the third electrode layer E3 tends to increase. The increase of the region where the second electrode layer E2 is exposed from the third electrode layer E3 tends not to suppress the occurrence of solder leaching. Therefore, the multilayer capacitor C1 reliably suppresses the occurrence of solder leaching, and suppresses the inhibition of gas movement through the opening 15.

In the multilayer capacitor C1, the number of the openings 15 per 1 $mm^2$ is 0.1 to 10.

In a case in which the number of the openings 15 per 1 $mm^2$ is smaller than 0.1, the gas having moved from the space 11 through the gap 13 tends not to move out of the external electrode 5. In a case in which the number of the openings per 1 $mm^2$ is larger than 10, the region where the second electrode layer E2 is exposed from the third electrode layer E3 tends to increase. The increase of the region where the second electrode layer E2 is exposed from the third electrode layer E3 tends not to suppress the occurrence of solder leaching. Therefore, the multilayer capacitor C1 reliably suppresses the occurrence of solder leaching, and suppresses the inhibition of the gas movement out of the external electrode 5.

In the present specification, in a case in which an element is described as being disposed on another element, the element may be directly disposed on the other element or be indirectly disposed on the other element. In a case in which an element is indirectly disposed on another element, an intervening element is present between the element and the other element. In a case in which an element is directly disposed on another element, no intervening element is present between the element and the other element.

In the present specification, in a case in which an element is described as covering another element, the element may directly cover the other element or indirectly cover the other element. In a case in which an element indirectly covers another element, an intervening element is present between the element and the other element. In a case in which an element directly covers another element, no intervening element is present between the element and the other element.

In the present specification, in a case in which an element is described as being located on another element, the element may be directly located on the other element or be indirectly located on the other element. In a case in which an element is indirectly located on another element, an intervening element is present between the element and the other element. In a case in which an element is directly located on another element, no intervening element is present between the element and the other element.

Although the embodiment of the present invention have been described above, the present invention is not necessarily limited to the embodiment, and the embodiment can be variously changed without departing from the scope of the invention.

The number of the spaces 11 existing in each of the external electrodes 5 may be one or plural. The number of the spaces 11 existing in one external electrode 5 and the number of the spaces 11 existing in the other external electrode 5 may be different. A shape of the space 11 is not limited to the illustrated shape.

The maximum length L1 of the space 11 is not necessarily in the range of 30 to 70% of the maximum width W1 of the second electrode layer E2. In a case in which the maximum length L1 of the space 11 is in the range of 30 to 70% of the maximum width W1 of the second electrode layer E2, in the multilayer capacitor C1, a crack tends not to occur in the external electrode 5 after solder-mounting and the multilayer capacitor C1 reliably suppresses the stress from acting on the second electrode layer E2, as described above.

The maximum length L2 of the space 11 is not necessarily in the range of 50 to 200% of the maximum width of the second electrode layer E2. In a case in which the maximum length L2 of the space 11 is in the range of 50 to 200% of the maximum width of the second electrode layer E2, in the multilayer capacitor C1, a crack tends not to occur in the external electrode 5 after solder-mounting and the multilayer capacitor C1 reliably suppresses the stress from acting on the second electrode layer E2, as described above.

The space 11 is not necessarily located on the central portion of the end surface 3e. In a case in which the space 11 is located on the central portion of the end surface 3e, the multilayer capacitor C1 suppresses the occurrence of the crack in the external electrode 5 as described above.

In the cross-section along the thickness direction of the second electrode layer E2, the area of the space 11 is not necessarily in the range of 5 to 50% of the area of the second electrode layer E2. In a case in which the area of the space 11 is in the range of 5 to 50% of the area of the second electrode layer E2 in the cross-section along the thickness direction of the second electrode layer E2, the multilayer capacitor C1 more reliably suppresses the stress from acting on the second electrode layer E2 as described above.

The opening 15 is not necessarily formed in the third electrode layer E3. In a case in which the opening 15 is formed in the third electrode layer E3, the multilayer capacitor C1 further suppresses the stress from acting on the second electrode layer E2 as described above.

The inner diameter of the opening 15 may be equal to or longer than the maximum length L2 of the space 11. In a case in which the inner diameter of the opening 15 is shorter than the maximum length L2 of the space 11, the multilayer capacitor C1 reliably suppresses the solder leaching as described above.

The inner diameter of the opening 15 is not necessarily in the range of 5 to 30% of the maximum length L2 of the space 11. In a case in which the inner diameter of the opening 15 is within the range of 5 to 30% of the maximum length L2 of the space 11, the multilayer capacitor C1 more reliably suppresses the occurrence of solder leaching and further suppress the stress from acting on the second electrode layer E2 reliably, as described above.

In the second electrode layer E2, the plurality of gaps 13 does not necessarily exist. In this case, the opening 15 may directly communicate with the space 11.

All the openings 15 may be covered with the fourth electrode layer E4. In this case, the second electrode layer E2 includes a region in contact with the third electrode layer E3 and a region in contact with the fourth electrode layer E4. All the openings 15 are not necessarily covered with the fourth electrode layer E4. In this case, the second electrode layer E2 includes a region in contact with the third electrode layer E3 and a region not in contact with the plating layers (the third electrode layer E3 and the fourth electrode layer E4). The plurality of openings 15 is not necessarily formed in the third electrode layer E3.

The electronic component of the present embodiment is the multilayer capacitor C1. Applicable electronic component is not limited to the multilayer capacitor. Examples of the applicable electronic components include, but not limited to, multilayer electronic components such as a multilayer inductor, a multilayer varistor, a multilayer piezoelectric actuator, a multilayer thermistor, or a multilayer composite component, and electronic components other than the multilayer electronic components.

What is claimed is:

1. An electronic component comprising:
an element body; and
an external electrode disposed on the element body, wherein
the external electrode includes a sintered metal layer, a conductive resin layer disposed on the sintered metal layer, and a solder plating layer arranged to constitute an outermost layer of the external electrode,
a space exists in the conductive resin layer or between the conductive resin layer and the sintered metal layer, and
a first maximum length of the space in a thickness direction of the conductive resin layer is shorter than a second maximum length of the space in a direction orthogonal to the thickness direction of the conductive resin layer.

2. The electronic component according to claim 1, wherein
the first maximum length is in a range of 30 to 70% of a maximum width of the conductive resin layer.

3. The electronic component according to claim 1, wherein
the second maximum length is in a range of 50 to 200% of a maximum width of the conductive resin layer.

4. The electronic component according to claim 1, wherein
the element body includes a principal surface arranged to constitute a mounting surface, and an end surface adjacent to the principal surface,
the external electrode is disposed at least on the end surface, and
the space is located on a central portion of the end surface.

5. The electronic component according to claim 1, wherein
in a cross-section along the thickness direction of the conductive resin layer, an area of the space is in a range of 5 to 50% of an area of the conductive resin layer.

6. The electronic component according to claim 1, wherein
in a cross-section along the thickness direction of the conductive resin layer, an area of the space is in a range of 5 to 30% of an area of the conductive resin layer.

7. The electronic component according to claim 1, wherein
the external electrode includes an intermediate plating layer disposed between the conductive resin layer and the solder plating layer,
the intermediate plating layer has better solder leach resistance than metal contained in the conductive resin layer, and
an opening communicating with the space is formed in the intermediate plating layer.

8. The electronic component according to claim 7, wherein
an inner diameter of the opening is shorter than the second maximum length.

9. The electronic component according to claim 8, wherein
the inner diameter of the opening is in a range of 5 to 30% of the second maximum length.

10. An electronic component comprising:
an element body; and
an external electrode disposed on the element body, wherein
the external electrode includes a sintered metal layer, a conductive resin layer disposed on the sintered metal layer, and a solder plating layer arranged to constitute an outermost layer of the external electrode,
a space exists in the conductive resin layer or between the conductive resin layer and the sintered metal layer, and
the space is flat in a thickness direction of the conductive resin layer.

* * * * *